(12) United States Patent
Dawson et al.

(10) Patent No.: US 8,914,469 B2
(45) Date of Patent: Dec. 16, 2014

(54) NEGOTIATING AGREEMENTS WITHIN A CLOUD COMPUTING ENVIRONMENT

(75) Inventors: Christopher J. Dawson, Arlington, VA (US); Vincenzo V. Diluoffo, Sandy Hook, CT (US); Michael D. Kendzierski, New York, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 12/636,662

(22) Filed: Dec. 11, 2009

(65) Prior Publication Data
US 2011/0145153 A1 Jun. 16, 2011

(51) Int. Cl.
*G06F 15/16* (2006.01)
*G06Q 20/00* (2012.01)
*G06Q 10/10* (2012.01)
*G06Q 50/18* (2012.01)

(52) U.S. Cl.
CPC .............. *G06Q 10/10* (2013.01); *G06Q 50/188* (2013.01)
USPC ............................................ 709/218; 705/80

(58) Field of Classification Search
CPC ............ H04L 67/1008; H04L 67/1031; H04L 5/0064; H04L 12/2439; H04L 41/0896; H04L 47/783; H04L 47/787
USPC ............................................ 709/218; 705/80
See application file for complete search history.

(56) References Cited

U.S. PATENT DOCUMENTS

| | | | |
|---|---|---|---|
| 7,082,463 B1 | 7/2006 | Bradley et al. | |
| 7,114,146 B2 * | 9/2006 | Zhang et al. ................... | 717/106 |
| 7,305,431 B2 | 12/2007 | Karnik et al. | |
| 7,464,160 B2 | 12/2008 | Iszlai et al. | |
| 7,596,620 B1 | 9/2009 | Colton et al. | |
| 7,870,044 B2 | 1/2011 | Robertson | |
| 2002/0099669 A1 * | 7/2002 | Lauer .............................. | 705/80 |
| 2003/0105810 A1 | 6/2003 | McCrory et al. | |
| 2003/0120771 A1 | 6/2003 | Laye et al. | |
| 2003/0154123 A1 | 8/2003 | Subbloie et al. | |
| 2004/0220910 A1 * | 11/2004 | Zang et al. ........................ | 707/3 |
| 2005/0172027 A1 | 8/2005 | Castellanos et al. | |

(Continued)

OTHER PUBLICATIONS

Bin Li; Gillam, L., "Towards job-specific service level agreements in the cloud," E-Science Workshops, 2009 5th IEEE International Conference on , vol., no., pp. 67,70, Dec. 9-11, 2009.*

(Continued)

*Primary Examiner* — Taylor Elfervig
(74) *Attorney, Agent, or Firm* — William E. Schiesser; Keohane & D'Alessandro PLLC

(57) ABSTRACT

The present invention provides a solution for agreement/contract negotiations within a Cloud computing environment. Specifically, under the present invention, a resource requirement for performing a task for a first Cloud partner is assessed. Once the resource requirement is known, it can be determined whether a shortfall exists between available resources of the first Cloud partner and the resource requirement. If so, a master agreement with a second Cloud partner is identified to address the shortfall. Typically, the master agreement specifies at least a minimum service requirement and a maximum price for the second Cloud partner to provide resources to address the shortfall. If the terms are agreeable to both Cloud partners, a contract between the two can be formed (e.g., digitally) based on the master agreement.

24 Claims, 6 Drawing Sheets

(56) References Cited

U.S. PATENT DOCUMENTS

| | | | |
|---|---|---|---|
| 2005/0188075 A1 | 8/2005 | Dias et al. | |
| 2006/0212545 A1 | 9/2006 | Nichols et al. | |
| 2006/0253587 A1 | 11/2006 | Tullis et al. | |
| 2008/0010293 A1 | 1/2008 | Zpevak et al. | |
| 2008/0046266 A1 | 2/2008 | Gudipalley et al. | |
| 2008/0080396 A1 | 4/2008 | Meijer et al. | |
| 2008/0082490 A1 | 4/2008 | MacLaurin et al. | |
| 2008/0155100 A1 | 6/2008 | Ahmed et al. | |
| 2008/0235149 A1 | 9/2008 | Dan et al. | |
| 2009/0089078 A1* | 4/2009 | Bursey | 705/1 |
| 2009/0112759 A1* | 4/2009 | Foster | 705/40 |
| 2009/0276771 A1* | 11/2009 | Nickolov et al. | 717/177 |
| 2009/0300635 A1* | 12/2009 | Ferris | 718/104 |
| 2010/0042449 A1* | 2/2010 | Thomas | 705/7 |
| 2010/0042720 A1 | 2/2010 | Stienhans et al. | |
| 2010/0061250 A1* | 3/2010 | Nugent | 370/242 |
| 2010/0131324 A1* | 5/2010 | Ferris | 705/8 |
| 2011/0137805 A1* | 6/2011 | Brookbanks et al. | 705/80 |
| 2011/0276713 A1* | 11/2011 | Brand | 709/232 |

OTHER PUBLICATIONS

Paletta, M.; Herrero, P., "A MAS-Based Negotiation Mechanism to Deal with Service Collaboration in Cloud Computing," Intelligent Networking and Collaborative Systems, 2009. INCOS '09. International Conference on , vol., no., pp. 147,153, Nov. 4-6, 2009.*

Nowak, D.; Perry, P.; Murphy, J., "Bandwidth allocation for service level agreement aware Ethernet passive optical networks," Global Telecommunications Conference, 2004. GLOBECOM '04. IEEE , vol. 3, no., pp. 1953,1957 vol. 3, Nov. 29-Dec. 3, 2004.*

Sato, M., "Creating Next Generation Cloud Computing Based Network Services and the Contributions of Social Cloud Operation Support System (OSS) to Society," Enabling Technologies: Infrastructures for Collaborative Enterprises, 2009. WETICE '09. 18th IEEE International Workshops on , vol., no., pp. 52,56, Jun. 29, 2009-Jul. 1, 2009.*

Mell et al., "The NIST Definition of Cloud Computing", National Institute of Standards and Technology, Information Technology Laboratory, Version 15, Oct. 7, 2009, 2 pages.

Maitland, J., "Keeping Control Isn't Easy", Chapter 4: Cloud-Based Infrastructure, SearchCloudComputing.com, 13 pages.

U.S. Appl. No. 12/636,666, Office Action, Mar. 31, 2011, 9 pages.

U.S. Appl. No. 12/636,666, Office Action, Sep. 29, 2011, 12 pages.

* cited by examiner

| MASTER AGREEMENT CLIENT 72A | RESOURCE 72B | AVAILABLE TIERS 72C | PROVISION UNIT 72D | PRICE PER MINUTE BY TIER 72E |
|---|---|---|---|---|
| CLOUD COMPANY A | ACME PROCESSOR | 1 / 2 / 3 | .5 CPU | 10 / 10 / 10 |
| CLOUD COMPANY B | BETA DATABASE | 1 / 2 / 3 | 250 MEGABYTES | 5 / 3 / 1 |
| CLOUD COMPANY C | DELTA PROTECTED STORAGE | 1 / 2 / 3 | 1 GIGABYTE | 15 / 10 / 5 |

FIG. 5

NEGOTIATING AGREEMENTS WITHIN A CLOUD COMPUTING ENVIRONMENT

CROSS-REFERENCE TO RELATED APPLICATION

This application is related in some aspects to U.S. application Ser. No. 12/636666, filed on Dec. 11, 2009, having and entitled "Dynamic Provisioning of Resources within a Cloud Computing Environment," the entire contents of which are herein incorporated by reference.

FIELD OF THE INVENTION

The present invention generally relates to Cloud computing. Specifically, the present invention relates to the negotiation (between Cloud partners) of contracts/agreements within a Cloud computing environment.

BACKGROUND OF THE INVENTION

The Cloud computing environment is an enhancement to the predecessor grid environment, whereby multiple grids and other computation resources may be further abstracted by the Cloud layer, thus making disparate devices appear to an end-user as a single pool of seamless resources. These resources may include such things as physical or logical compute engines, servers and devices, device memory, storage devices, networks, business applications and other software, and the like. It may be necessary for a Cloud to increase or decrease such resources either temporarily, or permanently, and/or to move active tasks between resources for efficiency, load balancing, and/or other purposes. With the vast number of generally under-utilized computing resources in homes, offices, and data centers throughout the world, an automated and cooperative mechanism for dynamic resources based on real-time, scheduled, and/or projected on-going requirements for Cloud resources is desirable. A borrowing entity obtains value in an increase of infrastructure resources as needed without the requirement of purchasing additional equipment. A lending entity may derive value in a number of ways, including monetary, social (a university "lends" resources to another party to solve a tough problem), relational (reciprocal lending/borrowing relationships), and the like. Based on such agreements, automated mechanisms can be established whereby one or more "partner" entities may be queried and, when appropriate, resources moved between the two. As an example, if the Cloud provider "A" anticipates computational requirements at a specific point in time beyond the capacity of its dedicated Cloud resources, it could perhaps temporarily move tasks to, or borrow resources from, its partner Cloud provider "B".

SUMMARY OF THE INVENTION

In general, the present invention provides a solution for automating agreement/contract negotiations within a Cloud computing environment. Specifically, under the present invention, a resource requirement for performing a task for a first Cloud partner is assessed. Once the resource requirement is known, it can be determined whether a shortfall exists between available resources of the first Cloud partner and the resource requirement. If so, a master agreement with a second Cloud partner is identified to address the shortfall. Typically, the master agreement specifies at least a minimum service requirement and a maximum price for the second Cloud partner to provide resources to address the shortfall. If the terms are agreeable to both Cloud partners, a contract between the two can be formed (e.g., digitally) based on the master agreement.

A first aspect of the present invention provides a method for providing automated contract negotiations within a Cloud computing environment, comprising: assessing a resource requirement for performing a task for a first Cloud partner within the Cloud computing environment; determining whether a shortfall exists between available resources of the first Cloud partner and the resource requirement; and identifying a master agreement for a second Cloud partner to address the shortfall, the master agreement specifying at least a minimum service requirement and a maximum price for the second Cloud partner to provide resources to address the shortfall.

A second aspect of the present invention provides a system for providing automated contract negotiations within a Cloud computing environment, comprising: a memory medium comprising instructions; a bus coupled to the memory medium; and a processor coupled to the bus that when executing the instructions causes the system to: assess a resource requirement for performing a task for a first Cloud partner within the Cloud computing environment; determine whether a shortfall exists between available resources of the first Cloud partner and the resource requirement; and identify a master agreement with a second Cloud partner to address the shortfall, the master agreement specifying at least a minimum service requirement and a maximum price for the second Cloud partner to provide resources to address the shortfall.

A third aspect of the present invention provides a computer readable medium containing a program product for providing automated contract negotiations within a Cloud computing environment, the computer readable medium comprising program code for causing a computer to: assess a resource requirement for performing a task for a first Cloud partner within the Cloud computing environment; determine whether a shortfall exists between available resources of the first Cloud partner and the resource requirement; and identify a master agreement with a second Cloud partner to address the shortfall, the master agreement specifying at least a minimum service requirement and a maximum price for the second Cloud partner to provide resources to address the shortfall.

A fourth aspect of the present invention provides architecture for providing automated contract negotiations within a Cloud computing environment, comprising: a first scheduler associated with a first Cloud partner, the first scheduler being configured to: assess a resource requirement for performing a task for the first Cloud partner, determine whether a shortfall exists between available resources of the first Cloud partner and the resource requirement, and access a master agreement database to identify a master agreement with a second Cloud partner to address the shortfall, the master agreement specifying at least a minimum service requirement and a maximum price for the second Cloud partner to provide resources to address the shortfall; a job management tunnel being configured to communicate with a second scheduler associated with the second Cloud partner to determine whether the second Cloud partner can address the shortfall; and a contract agent being configured to generate a contract between the first Cloud partner and the second Cloud partner based on the master agreement.

A fifth aspect of the present invention provides a method for providing automated contract negotiations within a Cloud computing environment, comprising: providing a computer infrastructure being operable to: assess a resource requirement for performing a task for a first Cloud partner within the Cloud computing environment; determine whether a shortfall exists between available resources of the first Cloud partner and the resource requirement; and identify a master agreement with a second Cloud partner to address the shortfall, the master agreement specifying at least a minimum service requirement and a maximum price for the second Cloud partner to provide resources to address the shortfall.

BRIEF DESCRIPTION OF THE DRAWINGS

These and other features of this invention will be more readily understood from the following detailed description of the various aspects of the invention taken in conjunction with the accompanying drawings in which:

FIG. 5 shows an illustrative master agreement database according to the present invention.

Figure 1:
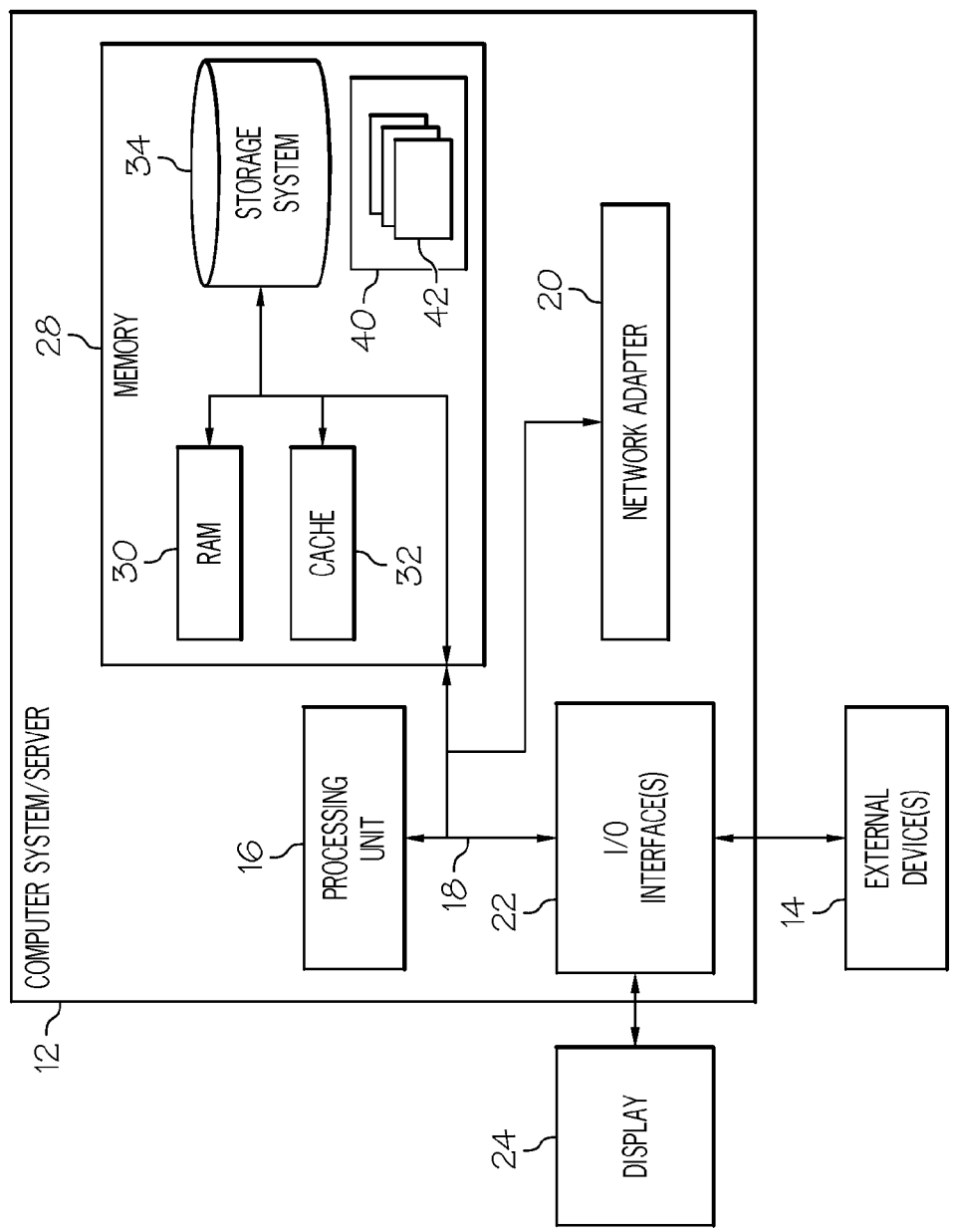
FIG. 1 shows a Cloud system node according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. Cloud Computing Definitions
II. Detailed Implementation of the Invention
I. Cloud Computing Definitions The following definitions have been derived from the "Draft NIST Working Definition of Cloud Computing" by Peter Mell and Tim Grance, dated Oct. 7, 2009, which is cited on an IDS filed herewith, and a copy of which is attached thereto.

Cloud computing is a model for enabling convenient, on-demand network access to a shared pool of configurable computing resources (e.g., networks, servers, storage, applications, and services) that can be rapidly provisioned and released with minimal management effort or service partner interaction. This Cloud model promotes availability and is comprised of at least five characteristics, at least three service models, and at least four deployment models.

Characteristics are as follows:

On-demand self-service: A consumer can unilaterally provision computing capabilities, such as server time and network storage, as needed. automatically without requiring human interaction with each service's partner.

Broad network access: Capabilities are available over a network and accessed through standard mechanisms that promote use by heterogeneous thin or thick client platforms (e.g., mobile phones, laptops, and PDAs).

Resource pooling: The partner's computing resources are pooled to serve multiple consumers using a multi-tenant model with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the partner and consumer of the utilized service.

Service Models are as follows:

Cloud Software as a Service (SaaS): The capability provided to the consumer is to use the partner's applications running on a Cloud infrastructure. The applications are accessible from various client devices through a thin client interface such as a web browser (e.g., web-based email). The consumer does not manage or control the underlying Cloud infrastructure including network, servers, operating systems, storage, or even individual application capabilities, with the possible exception of limited user-specific application configuration settings.

Cloud Platform as a Service (PaaS): The capability provided to the consumer is to deploy onto the Cloud infrastructure consumer-created or acquired applications created using programming languages and tools supported by the partner. The consumer does not manage or control the underlying Cloud infrastructure including networks, servers, operating systems, or storage, but has control over the deployed applications and possibly application hosting environment configurations.

Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying Cloud infrastructure but has control over operating systems, storage, deployed applications, and possibly limited control of select networking components (e.g., host firewalls).

Deployment Models (also known as "Cloud implementations" or "Cloud types") are as follows:

Private Cloud: The Cloud infrastructure is operated solely for an organization. It may be managed by the organization or a third party and may exist on-premises or off-premises.

Community Cloud: The Cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: The Cloud infrastructure is made available to the general public or a large industry group and is owned by an organization selling Cloud services.

Hybrid Cloud: The Cloud infrastructure is a composition of two or more Clouds (private, community, or public) that remain unique entities but are bound together by standardized or proprietary technology that enables data and application portability (e.g., Cloud bursting for load-balancing between Clouds).

A Cloud computing environment is service oriented with a focus on statelessness, low coupling, modularity, and semantic interoperability.

II. Implementation of the Invention

As indicated above, the present invention provides a solution for automating agreement/contract negotiations within a Cloud computing environment. Specifically, under the present invention, a resource requirement for performing a task for a first Cloud partner is assessed. Once the resource requirement is known, it can be determined whether a shortfall exists between available resources of the first Cloud partner and the resource requirement. If so, a master agreement with a second Cloud partner is identified to address the shortfall. Typically, the master agreement specifies at least a minimum service requirement and a maximum price for the second Cloud partner to provide resources to address the shortfall. If the terms are agreeable to both Cloud partners, a contract between the two can be formed (e.g., digitally) based on the master agreement.

Referring now to FIG. 1, a schematic of an exemplary Cloud computing node is shown. Cloud computing node 10 is only one example of a suitable Cloud computing node and is not intended to suggest any limitation as to the scope of use or functionality of the invention described herein. Regardless, Cloud computing node 10 is capable of being implemented and/or performing any of the functions set forth in Section I above.

In Cloud computing node 10. there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed Cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on, that perform particular tasks or implement particular abstract data types. The exemplary computer system/server 12 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 1, computer system/server 12 in Cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, and removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

Program/utility 40 having a set (at least one) of program modules 42 may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
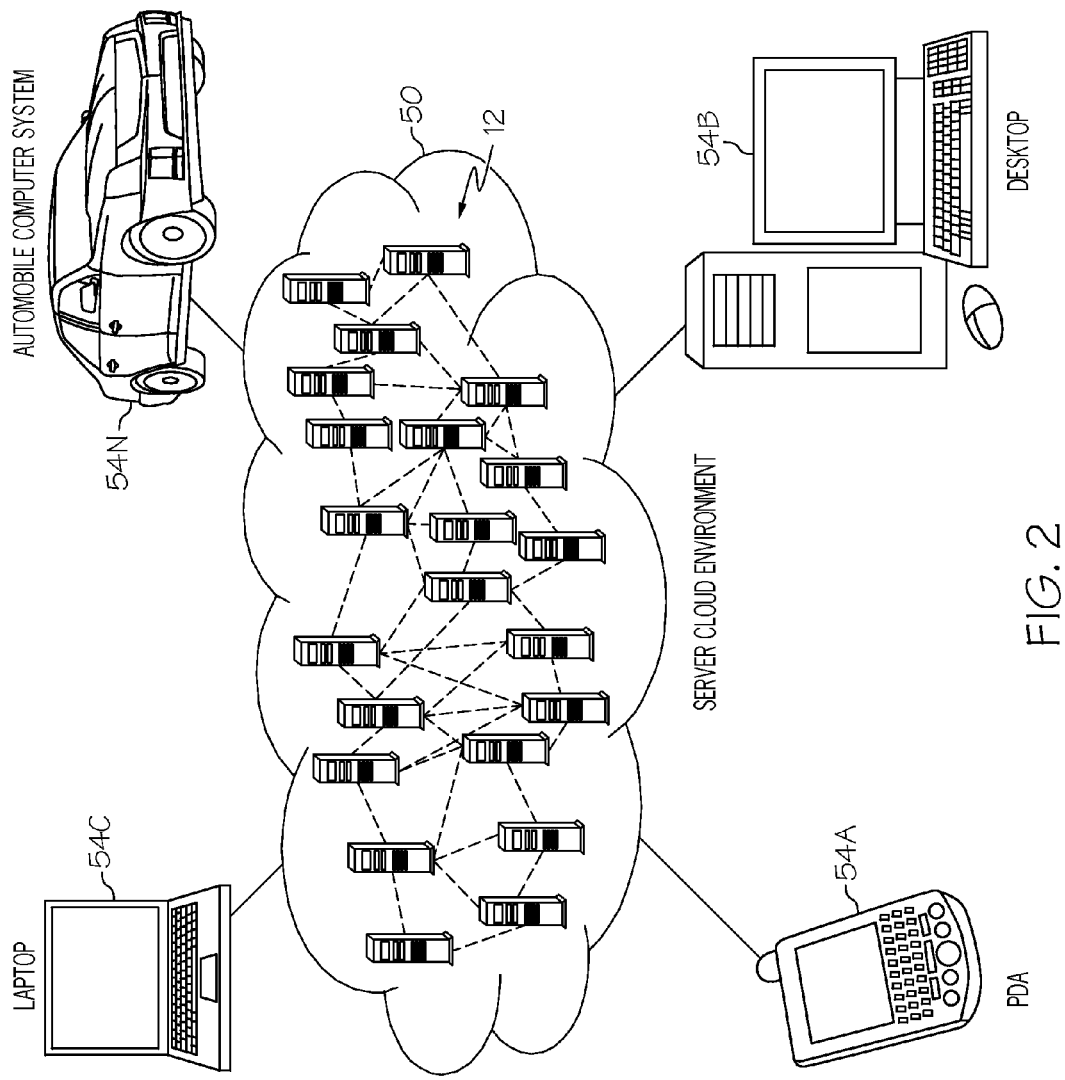
FIG. 2 shows a Cloud computing environment according to the present invention.

Referring now to FIG. 2, illustrative Cloud computing environment 50 is depicted. As shown, Cloud computing environment 50 comprises one or more Cloud computing nodes 10 with which computing devices such as, for example, personal digital assistant (PDA) or cellular telephone 54A, desktop computer 54B, laptop computer 54C, and/or automobile computer system 54N communicate. This allows for infrastructure, platforms and/or software to be offered as services (as described above in Section I) from Cloud computing environment 50, so as to not require each client to separately maintain such resources. It is understood that the types of computing devices 54A-N shown in FIG. 2 are intended to be illustrative only and that Cloud computing environment 50 can communicate with any type of computerized device over any type of network and/or network/addressable connection (e.g., using a web browser).

Figure 3:
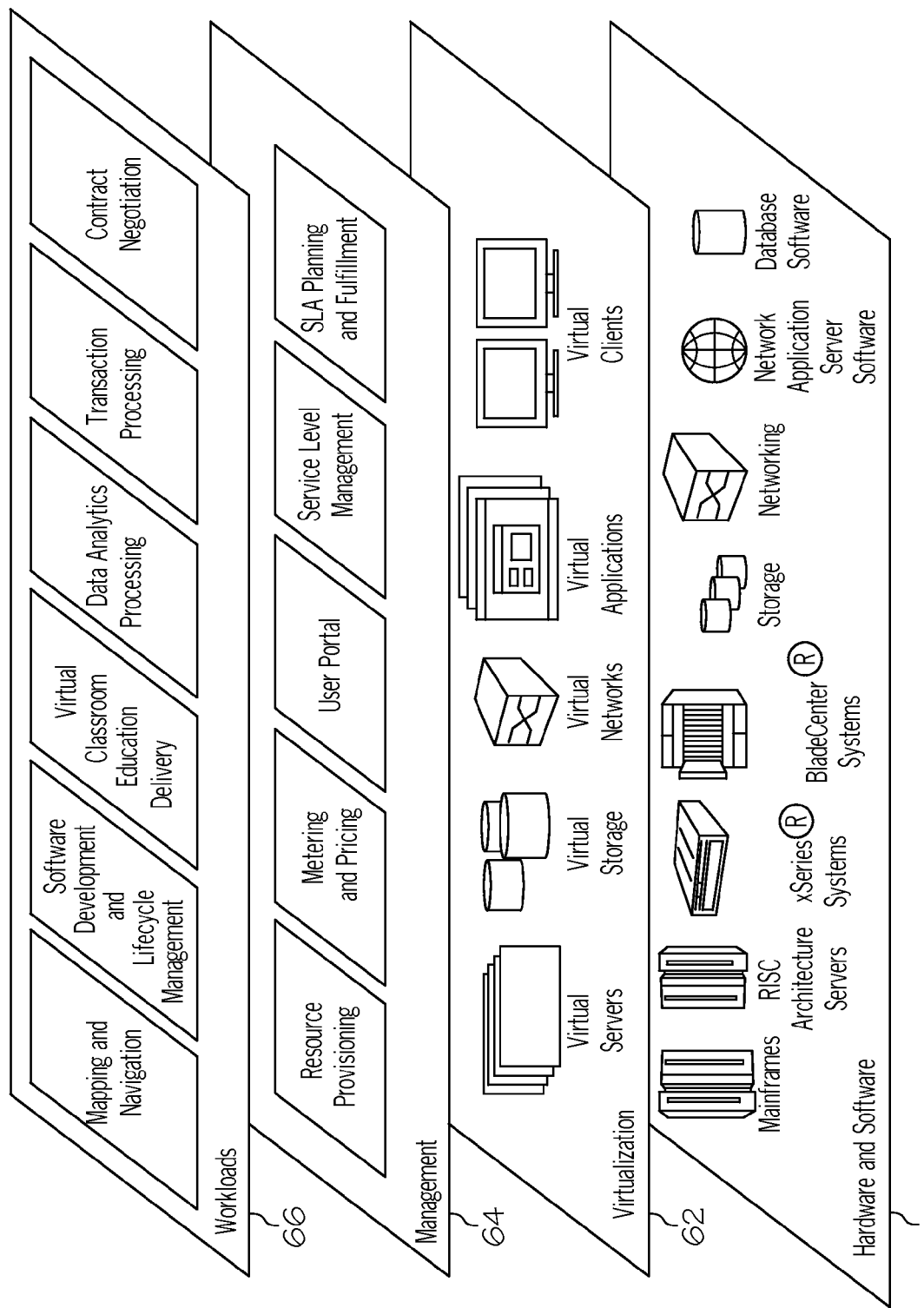
FIG. 3 shows Cloud abstraction model layers according to the present invention.

Referring now to FIG. 3, a set of functional abstraction layers provided by Cloud computing environment 50 (FIG. 2) is shown. It should be understood in advance that the components, layers, and functions shown in FIG. 3 are intended to be illustrative only and the invention is not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual applications; and virtual clients.

Management layer 64 provides the exemplary functions described below. Resource provisioning provides dynamic procurement of computing resources and other resources that are utilized to perform tasks within the Cloud computing environment. Metering and pricing provide cost tracking as resources are utilized within the Cloud computing environment, and billing or invoicing for consumption of these resources. In one example, these resources may comprise application software licenses. Security provides identity verification for users and tasks, as well as protection for data and other resources. User portal provides access to the Cloud computing environment for both users and system administrators. Service level management provides Cloud computing resource allocation and management such that required service levels are met. Service Level Agreement (SLA) planning and fulfillment provides pre-arrangement for, and procurement of, Cloud computing resources for which a future requirement is anticipated in accordance with an SLA.

Workloads layer 66 provides functionality for which the Cloud computing environment is utilized. Examples of workloads and functions which may be provided from this layer include: mapping and navigation; software development and lifecycle management; virtual classroom education delivery; data analytics processing; transaction processing; contract negotiating. As mentioned above, all of the foregoing examples described with respect to FIG. 3 are illustrative only, and the invention is not limited to these examples.

Contract negotiation functionality generally implements the teachings of the present invention. To this extent, contract negotiating functionality can be implemented as hardware, software (e.g., program modules 42 of utility/program 40), or a combination thereof. Regardless, the contract negotiating functions of the present invention will be further described in conjunction with FIGS. 4-7, as well as the illustrative examples set forth below.

In general, the present invention would include a master agreement between Cloud (service) partners (also referred to as Cloud providers) specifying minimum task servicing requirements and maximum associated prices/fees. Such agreements are useful when a client side task is submitted to a given Cloud, but that Cloud either cannot accept the task or determines that it cannot complete the task, due to such conditions as over-subscription, pending planned outage, and/or infrastructure problems or failures, and the like. With such a master agreement in place, one Cloud partner can negotiate, in an automated manner, with at least a second Cloud partner and thus pass through a submitted client task submission transparent to the client side submitter. Such automated service contract negotiations may be specific to an individual task, may span a period of time, or may be open ended. The requested Cloud would likely establish the contract type with the requester based on current Cloud resource utilization and projections. Additionally, time spanning and open-ended contracts will likely contain a provision allowing the partner to adjust the service fee over time based on real-time conditions within the executing Cloud. Finally, such contract negotiations may occur with multiple potential Cloud partners simultaneously, ultimately selecting the partner that comes closest to optimal terms.

Illustrative Example

Cloud-1 has scheduled maintenance at midnight, but also has pending tasks scheduled to run during the maintenance window.

Cloud-1 contract agent scans the master agreement database for suitable matches.

For each suitable match found in the database, the contract agent connects to the alternate environments contract agent and creates the agreement.

This process is repeated for each scheduled task until all tasks have somewhere to route (perhaps sending tasks to many different alternates based on characteristics and costs).

During this contracted time period, real-time task request coming into Cloud-1 would likewise be routed.

Any task unable to be routed through the master database entries would branch to a real-time search.

At the completion of the Cloud-1 maintenance, the contracts with the alternates are terminated, and tasks once again begin to run locally on Cloud-1.

Figure 4:
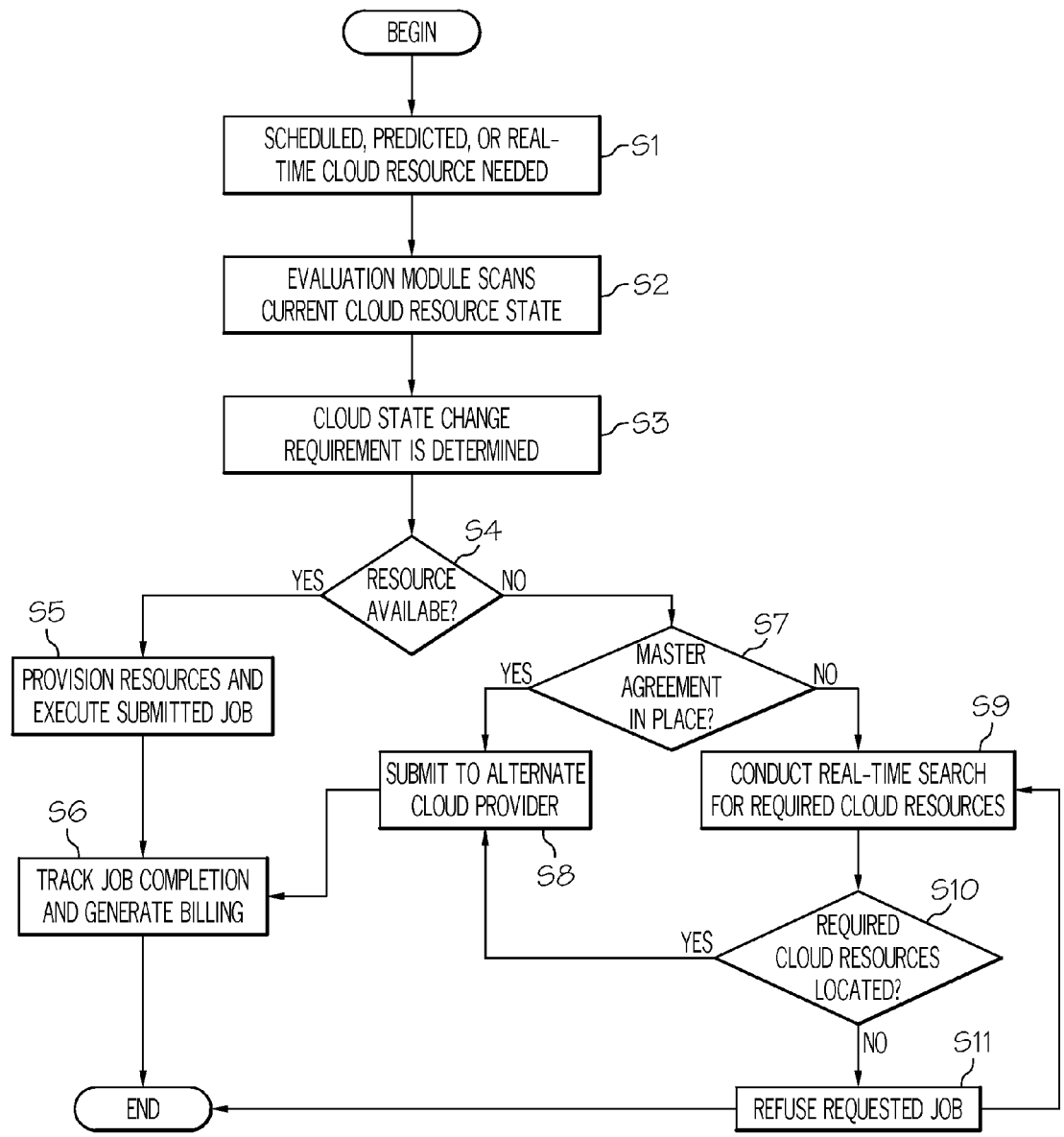
FIG. 4 shows a method diagram according the present invention.

These concepts will be expanded upon in conjunction with FIG. 4. As depicted, in step S1, it is determined that Cloud resources are needed. This need can be determined on a scheduled basis, in a predicted fashion, and/or in real-time (e.g., based upon request). In step S2, an evaluation model scans a current resource state of a first Cloud partner. In step S3, it is determined that a change in state is required or needed (e.g., one or more tasks are to be performed). In step S4, it is determined whether the first Cloud partner has the resources available to meet the resource requirement needed to fulfill/complete the task. If so, resources are provisioned accordingly in step S5, and the job to complete the task is tracked (e.g., to completion and/or billing) in step S6. If, however, it was determined in step S4 that the first Cloud partner does not have the resources available, then a second Cloud partner will be identified to address the shortfall (i.e., between the available resources of the first Cloud partner and the resource requirement). Specifically, it will be determined in step S7 where a master agreement is in place with a second Cloud partner. If so, the task/job is submitted to the second Cloud partner in step S8, and the process returns to step S6 for tracking of the job. If not, a real-time search is conducted of a master agreement database in step S9 to identify a second Cloud partner capable of addressing the shortfall. If one partner is identified, it is determined whether the second Cloud partner has resources available to fulfill the shortfall in step S10. If so, the task/job is submitted to that second Cloud partner in step S8, and the process returns to step S6 for tracking of the job. If sufficient resources were not available in step S10, the job will be refused in step S11 by the second Cloud partner. It should be noted that before the job is deemed "uncompletable" under the present invention, the process can return to step S9 for an updated search for a Cloud partner that is capable of completing the task.

In a preferred embodiment of the present invention, the master agreement database would be a relational database. Relational databases are very flexible, scalable, and perform well, and also provide broad capabilities for storing and indexing data, dynamically adding, deleting, and modifying data, and reading and formatting data. One element of the present invention is the provision of a local master agreement database (e.g., for each Cloud partner) such that as requests come in, many will be satisfied by a quick local scan of the database, thus removing the need to do real-time searches and negotiations every time.

FIG. 5 depicts an example of some of the fields 72A-E that may be stored in a table 70 of the database. As shown, table 70 can include a client/partner identifier field 72A, a resource field 72B, an available service level field 72C (e.g. expressed in tiers or levels), a provision unit field 72D, and a price field 72E. These fields inform potential users of (among other things) the types of resources available, the Cloud partners who will make them available, and a minimum service level and maximum price at which they will be provided.

Figure 6:
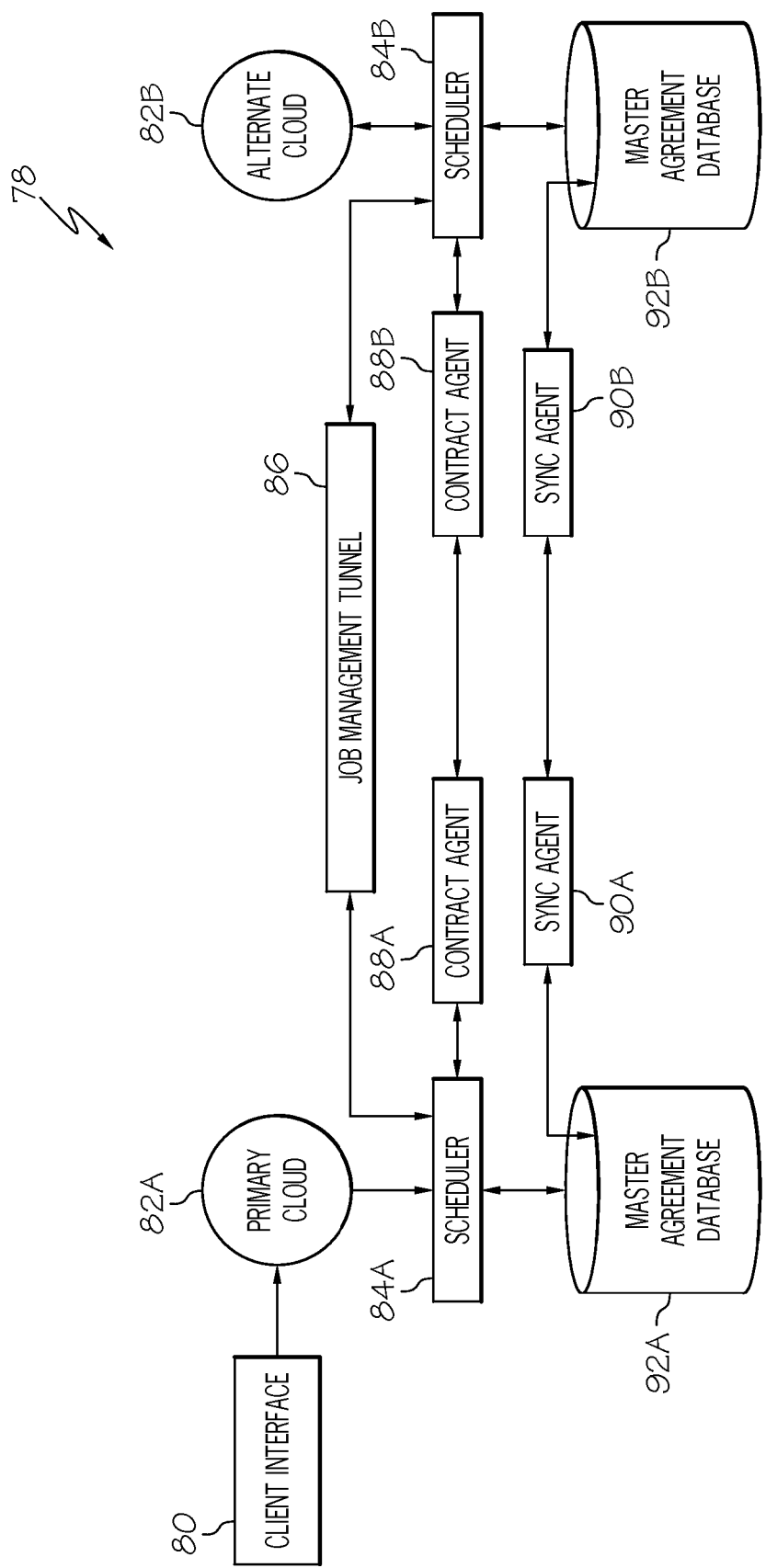
FIG. 6 shows illustrative logical elements used to provide automated contract negotiations within a Cloud computing environment according to the present invention.

In a typical embodiment, the master agreement database would be accessed by logic in the Cloud scheduler software. It could also be implemented as a stand-alone subsystem. Regardless, FIG. 6 provides a diagram of one possible architecture 78 according to the present invention. Specifically, FIG. 6 depicts an architecture 78 for allowing Cloud partners 82A-B to automatically negotiate and/or contract with one another for Cloud resources (e.g., via client interfaces 80). As shown, each Cloud partner can be associated with a scheduler 84A-B, a contract agent 88A-B, a synchronization agent 90A-B, and a master agreement database 92A-B. As further shown, job management tunnel 86 couples scheduler 84A to scheduler 84B and serves as the management and implementation tool for resource provisioning under the present invention, so that task jobs can be completed.

In general, schedulers 84A-B are configured to: assess a resource requirement for performing a task for their respective Cloud partners; determine whether a shortfall exists between available resources of the first Cloud partner and the resource requirement; and access master agreement databases 92A-B to identify a master agreement with a second Cloud partner to address the shortfall. As indicated above, the master agreement typically specifies at least a minimum service requirement and a maximum price for the second Cloud partner to provide resources to address the shortfall. Job management tunnel 86 is configured to facilitate communications among Cloud partners 82A-B for task job completion. For example, job management tunnel 86 can communicate with a second scheduler associated with Cloud partner 82B to determine whether the Cloud partner 82B can address any resource shortfall that Cloud provider 82A may have in completing a given task. Assuming the terms of Cloud partner 82B's provision of resources for Cloud partner 82A to complete a task is acceptable to Cloud partner 82A, contract agents 88A-B can generate a contract (e.g., digitally signed) between the first Cloud partner and the second Cloud partner based on the master agreement. Specifically, When a request is received that can be satisfied by the master agreement, a contact is assembled and signed by the partner, and submitted to the requester. This dynamic contract thus becomes the basis for billing the current request and reduces the need for further human intervention. In an alternate embodiment, the service receiver could have the option of reviewing and accepting or declining the contract.

Synchronization agents 90A-B monitor master agreement databases 92A-B. The purpose of this is to keep database data relevant to each specific participant synchronized. As an example, if the alternate Cloud provides tier-1 thru tier-6 disk storage to the primary Cloud, and decides to no longer maintain tier-6 storage, the alternate Cloud database records would be updated to reflect this change, at which time the synchronization agents 90A-B would connect other synchronization agents affected by the change, thus allowing them to make the same record updates. A preferred embodiment would also include a notification system whereby the down-stream records affected by the change would not be updated until the Cloud administrator optionally reviewed and accepted the change. Fees for inconvenience changes, such as reduction of available services, may be included as part of the initial master agreement.

While shown and described herein as an agreement/contract negotiation solution for resource sharing in a Cloud computing environment, it is understood that the invention further provides various alternative embodiments. For example, in one embodiment, the invention provides a computer-readable/useable medium that includes computer program code to enable a computer infrastructure to provide contract negotiation functionality as discussed herein. To this extent, the computer-readable/useable medium includes program code that implements each of the various processes of the invention. It is understood that the terms computer-readable medium or computer-useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a method that performs the process of the invention on a subscription, advertising, and/or fee basis. That is, a service partner, such as a Solution Integrator, could offer to provide contract negotiation within a Cloud computing environment. In this case, the service partner can create, maintain, support, etc., a computer infrastructure, such as computer system 12 (FIG. 1) that performs the process of the invention for one or more customers. In return, the service partner can receive payment from the customer(s) under a subscription and/or fee agreement and/or the service partner can receive payment from the sale of advertising content to one or more third parties.

In still another embodiment, the invention provides a computer-implemented method for providing contract negotiation functionality. In this case, a computer infrastructure, such as computer system 12 (FIG. 1), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code. or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program; component software/a library of functions; an operating system; a basic device system/driver for a particular computing device; and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for providing automated contract negotiations within a Cloud computing environment, comprising:
    establishing a master agreement between a first Cloud partner and a second Cloud partner before a shortfall exists, the master agreement specifying at least a minimum service requirement and a maximum price payable at which available resources will be provided;
    wherein each of the first Cloud partner and the second Cloud partner comprises:
        a processor, and
        a system memory in communication with the processor;
    wherein the first Cloud partner is associated with:
        a scheduler that performs a process comprising:
            assessing a resource requirement for performing a task, issued by a client, for the first Cloud partner,
            determining whether the shortfall exists between available resources of the first Cloud partner and the resource requirement, and
            accessing a master agreement database to identify the master agreement with the second Cloud partner to address the shortfall;
        a contract agent that performs a process comprising;
        generating, with a contract agent associated with the second Cloud partner, a digitally signed contract between the first Cloud partner and the second Cloud partner; and
        the master agreement database comprising master agreements;
    establishing a service level agreement between the first Cloud partner and the client; assessing the resource requirement for performing the task, issued by the client, for the first Cloud partner within the Cloud computing environment;
    determining whether the shortfall exists between available resources of the first Cloud partner and the resource requirement;
    searching, based on the resource requirement and an identity of the first Cloud provider, a master agreement for a Cloud partner to provide resources to address the shortfall;
    identifying, from the master agreement, the second Cloud partner to address the shortfall;
    submitting the task via transmissions that are transparent to the client, to the second Cloud partner; and
    reverting to the first Cloud partner in response to the shortfall no longer existing.

2. The method of claim 1, exchanging the resources at a service level at least equal to the minimum service level and for a price the does not exceed the maximum price specified in the master agreement.

3. The method of claim 1, the identifying comprising searching a master agreement database containing a set of cloud providers for the master agreement.

4. The method of claim 3, further comprising synchronizing the master agreement database with another master agreement database.

5. The method of claim 1, further comprising generating a digitally signed contract between the first Cloud partner and the second Cloud partner based on the master agreement.

6. The method of claim 1, further comprising:
    scanning, by the contract agent associated with the first Cloud partner, the master agreement database to locate the second Cloud partner;
    connecting, by the contract agent associated with the first Cloud partner, to the contract agent associated with the second Cloud partner; and generating the digitally signed contract between the first Cloud partner and the second Cloud partner.

7. The method of claim 1, further comprising:
    tracking progression of the task.

8. A system for providing automated contract negotiations within a Cloud computing environment, comprising:
    a memory medium comprising instructions;
    a bus coupled to the memory medium; and
    a processor coupled to the bus that when executing the instructions causes the system to:

establish a master agreement between a first Cloud partner and a second Cloud partner before a shortfall exists, the master agreement specifying at least a minimum service requirement and a maximum price payable at which available resources will be provided;
wherein each of the first Cloud partner and the second Cloud partner comprises:
a processor, and
a system memory in communication with the processor;
wherein the first Cloud partner is associated with:
a scheduler the performs a process comprising:
assess a resource requirement for performing a task, issued by a client, for the respective Cloud partner,
determine whether the shortfall exists between available resources of the first Cloud partner and the resource requirement, and
access a master agreement database to identify the master agreement with the second Cloud partner to address the shortfall;
a contract agent the performs a process compring:
generate, with a contract agent associated with the second Cloud partner, a digitally signed contract between the first Cloud partner and the second Cloud partner; and[H]
the master agreement database comprising master agreements;
establish a service level agreement between the first Cloud partner and the client;
assess the resource requirement for performing the task, issued by the client, for the first Cloud partner within the Cloud computing environment;
determine whether the shortfall exists between available resources of the first Cloud partner and the resource requirement;
search, based on the resource requirement and an identity of the first Cloud provider, the master agreement for a Cloud partner to provide resources to address the shortfall;
identify, from the master agreement, the second Cloud partner to address the shortfall;
submit the task via transmissions that are transparent to the client, to the second Cloud partner; and
revert to the first Cloud partner in response to the shortfall no longer existing.

9. The system of claim 8, the system further being caused to exchange the resources at a service level at least equal to the minimum service level and for a price the does not exceed the maximum price specified in the master agreement.

10. The system of claim 8, the system further being caused to conduct a search a master agreement database containing a set of cloud providers for the master agreement.

11. The system of claim 10, the system further being caused to synchronize the master agreement database with another master agreement database.

12. The system of claim 8, the system further being caused to generate a digitally signed contract between the first Cloud partner and the second Cloud partner based on the master agreement.

13. The system of claim 8, the system further being caused to:
scan, by the contract agent associated with the first Cloud partner, the master agreement database to locate the second Cloud partner;
connect, by the contract agent associated with the first Cloud partner, to the contract agent associated with the second Cloud partner; and
generate the digitally signed contract between the first Cloud partner and the second Cloud partner.

14. The system of claim 8, the system further being caused to:
track progression of the task.

15. A non-transitory computer readable medium containing a program product for providing automated contract negotiations within a Cloud computing environment, the computer readable medium comprising program code for causing a computer to:
establish a master agreement between a first Cloud partner and a second Cloud partner before a shortfall exists, the master agreement specifying at least a minimum service requirement and a maximum price payable at which available resources will be provided;
wherein each of the first Cloud partner and the second Cloud partner comprises:
a processor, and
a system memory in communication with the processor;
wherein the first Cloud partner is associated with:
a scheduler the performs a process comprising:
assess a resource requirement for performing a task, issued by a client, for the respective Cloud partner,
determine whether the shortfall exists between available resources of the first Cloud partner and the resource requirement, and
access a master agreement database to identify the master agreement with the second Cloud partner to address the shortfall;
a contract agent that performs a process comprising:
generate, with a contract agent associated with the second Cloud partner, a digitally signed contract between the first Cloud partner and the second Cloud partner; and
the master agreement database comprising master agreements;
establish a service level agreement between the first Cloud partner and the client;
assess the resource requirement for performing the task for the first Cloud partner within the Cloud computing environment;
determine whether the shortfall exists between available resources of the first Cloud partner and the resource requirement;
search, based on the resource requirement and an identity of the first Cloud provider, a master agreement for Cloud partner to provide resources to address the shortfall;
identify, from the master agreement, the second Cloud partner to address the shortfall;
submit the task via transmissions that are transparent to the client, to the second Cloud partner; and revert to the first Cloud partner in response to the shortfall no longer existing.

16. The non-transitory computer readable medium containing the program product of claim 15, the computer readable medium further comprising program code for causing the computer to exchange the resources at a service level at least equal to the minimum service level and for a price the does not exceed the maximum price specified in the master agreement.

17. The non-transitory computer readable medium containing the program product of claim 15, the computer readable medium further comprising program code for causing the computer to conduct a search of a master agreement database containing a set of cloud providers for the master agreement.

18. The non-transitory computer readable medium containing the program product of claim 17, the computer readable medium further comprising program code for causing the computer to synchronize the master agreement database with another master agreement database.

19. The non-transitory computer readable medium containing the program product of claim 15, the computer readable medium further comprising program code for causing the computer to generate a digitally signed contract between the first Cloud partner and the second Cloud partner based on the master agreement.

20. The non-transitory computer readable medium containing the program product of claim 15, the computer readable medium further comprising program code for causing the computer to:
   scan, by the contract agent associated with the first Cloud partner, the master agreement database to locate the second Cloud partner;
   connect, by the contract agent associated with the first Cloud partner, to the contract agent associated with the second Cloud partner; and
   generate the digitally signed contract between the first Cloud partner and the second Cloud partner.

21. The non-transitory computer readable medium containing the program product of claim 15, the computer readable medium further comprising program code for causing the computer to:
   track progression of the task.

22. A method for providing automated contract negotiations within a Cloud computing environment, comprising:
   providing a computer infrastructure being operable to:
      establish a master agreement between a first Cloud partner and a second Cloud partner before a shortfall exists, the master agreement specifying at least a minimum service requirement and a maximum price payable at which available resources will be provided;
      wherein each of the first Cloud partner and the second Cloud partner comprises:
         a processor, and
         a system memory in communication with the processor;
      wherein the first Cloud partner is associated with:
         a scheduler that performs a process comprising:
            assess a resource requirement for performing a task, issued by a client, for the first Cloud partner,
            determine whether the shortfall exists between available resources of the first Cloud partner and the resource requirement, and
            access a master agreement database to identify the master agreement with the second Cloud partner to address the shortfall;
         a contract agent that performs a process comprising: generate, with a contract agent associated with the second Cloud partner, a digitally signed contract between the first Cloud partner and the second Cloud partner; and
         the master agreement database comprising master agreements;
   establish a service level agreement between the first Cloud partner and the client;
   assess the resource requirement for performing the task, issued by the client, for the first Cloud partner within the Cloud computing environment;
   determine whether the shortfall exists between available resources of the first Cloud partner and the resource requirement;
   search, based on the resource requirement and an identity of the first Cloud provider, the master agreement for the a Cloud partner to provide resources to address the shortfall;
   identify, from the master agreement, the second Cloud partner to address the shortfall;
   submit the task via transmissions that are transparent to the client, to the second Cloud partner; and
   revert to the first Cloud partner in response to the shortfall no longer existing.

23. The method of claim 22, further comprising:
   scan, by the contract agent associated with the first Cloud partner, the master agreement database to locate the second Cloud partner;
   connect, by the contract agent associated with the first Cloud partner, to the contract agent associated with the second Cloud partner; and
   generate the digitally signed contract between the first Cloud partner and the second Cloud partner.

24. The method of claim 22, further comprising:
   track progression of the task.

* * * * *